(12) United States Patent
Himstedt et al.

(10) Patent No.: US 11,510,515 B2
(45) Date of Patent: *Nov. 29, 2022

(54) SCRIM-REINFORCED CUSHION MAT FOR CARPET TILES

(71) Applicant: JOHNS MANVILLE, Denver, CO (US)

(72) Inventors: Heath H. Himstedt, Littleton, CO (US); Souvik Nandi, Highlands Ranch, CO (US); Katelyn Grace Horn, Greenville, SC (US); Philip Christopher Sharpe, Weddington, NC (US)

(73) Assignee: Johns Manville, Denver, CO (US)

( * ) Notice: Subject to any disclaimer, the term of this patent is extended or adjusted under 35 U.S.C. 154(b) by 237 days.

This patent is subject to a terminal disclaimer.

(21) Appl. No.: 16/179,269

(22) Filed: Nov. 2, 2018

(65) Prior Publication Data

US 2020/0138221 A1 May 7, 2020

(51) Int. Cl.
| | | |
|---|---|---|
| *D06N 7/00* | (2006.01) | |
| *B32B 7/12* | (2006.01) | |
| *A47G 27/02* | (2006.01) | |
| *B32B 27/32* | (2006.01) | |
| *B32B 27/36* | (2006.01) | |

(52) U.S. Cl.
CPC ..... *A47G 27/0212* (2013.01); *A47G 27/0275* (2013.01); *D06N 7/0076* (2013.01); *D06N 7/0078* (2013.01); *D06N 7/0081* (2013.01); *D06N 7/0086* (2013.01); *B32B 7/12* (2013.01); *B32B 27/32* (2013.01); *B32B 27/36* (2013.01); *B32B 2262/0253* (2013.01); *B32B 2262/0276* (2013.01); *B32B 2307/72* (2013.01); *B32B 2471/02* (2013.01)

(58) Field of Classification Search
CPC ........... B32B 5/06; B32B 5/022; B32B 5/024; B32B 2471/02; B32B 5/271; B32B 5/277; B32B 5/26; B32B 5/273; B32B 5/275; D06N 7/0076; D06N 7/0081; D06N 7/0086

See application file for complete search history.

(56) References Cited

U.S. PATENT DOCUMENTS

| | | | |
|---|---|---|---|
| 4,010,302 A | | 3/1977 | Anderson et al. |
| 4,522,857 A | | 6/1985 | Higgins |
| 4,689,256 A | | 8/1987 | Slosberg et al. |
| 4,871,603 A | | 10/1989 | Malone |
| 5,198,277 A | | 3/1993 | Hamilton et al. |
| 5,470,648 A | * | 11/1995 | Pearlman ................. B32B 5/26 442/26 |

(Continued)

*Primary Examiner* — Larissa Rowe Emrich
(74) *Attorney, Agent, or Firm* — Robert D. Touslee

(57) ABSTRACT

A carpet tile includes a textile top member and a cushion mat that is coupled with the textile top member via a thermoplastic material. The textile top member includes carpet yarns and a backing that is coupled with the carpet yarns so that the backing structurally supports the carpet yarns. The cushion mat includes a polymeric material component having polymer fibers that are randomly oriented and entangled together and a scrim reinforcement that is disposed within the polymeric material component. The scrim reinforcement reinforces and stabilizes the polymeric material component and is entirely covered and concealed by the intermeshed polymer fibers.

19 Claims, 4 Drawing Sheets

(56) References Cited

U.S. PATENT DOCUMENTS

| | | | |
|---|---|---|---|
| 5,540,968 A | | 7/1996 | Higgins |
| 5,612,113 A | * | 3/1997 | Irwin, Sr. ................ B32B 27/12 428/95 |
| 5,759,927 A | * | 6/1998 | Meeker ................ B29C 70/502 442/334 |
| 6,060,145 A | * | 5/2000 | Smith ....................... B32B 5/06 428/95 |
| 6,280,818 B1 | * | 8/2001 | Smith ....................... B32B 5/26 428/95 |
| 7,918,313 B2 | | 4/2011 | Gross et al. |
| 2005/0287334 A1 | * | 12/2005 | Wright ................... B32B 5/022 428/95 |

* cited by examiner

SCRIM-REINFORCED CUSHION MAT FOR CARPET TILES

BACKGROUND OF THE INVENTION

Carpet tiles offer considerable advantages over rugs or wall to wall carpeting. For example, the use of carpet tiles for floor covering provides a simple installation process and allows removal of individual tiles which have become worn or soiled more than other tiles. Additionally, tiles may be rearranged or replaced to enhance decorative effects. Conventional carpet tiles include a pile fabric facing set into a layer of resilient thermoplastic (including elastomeric) material which is stiffened with a layer of suitable stiffening fibers, such as fiberglass fibers. The tile is generally backed with another layer of resilient elastomeric or thermoplastic material to which an adhesive may be applied to set the carpet tile onto the floor.

BRIEF SUMMARY OF THE INVENTION

The embodiments described herein provide a structurally reinforced cushioned impact-dampening component for carpet tile applications and other applications that utilize a cushioned backing or carrier. According to one aspect a carpet tile includes a textile top member and a cushion mat that is coupled with the textile top member via a thermoplastic material. The textile top member includes carpet yarns and a backing that is coupled with the carpet yarns so that the backing structurally supports the carpet yarns. The cushion mat includes a polymeric material component and a scrim reinforcement that is disposed within the polymeric material component. The polymeric material component includes polymer fibers that are randomly oriented and entangled together and the scrim reinforcement is disposed within the polymeric material component so that the scrim reinforcement is entirely covered and concealed by the intermeshed or entangled polymer fibers to prevent the scrim reinforcement from exposure to a user. The scrim reinforcement reinforces and stabilizes the polymeric material component.

According to another aspect, a method of manufacturing a carpet tile includes coupling a cushion mat to a textile top member of the carpet tile via an adhesive material.

The cushion mat includes a polymeric material component that includes polymer fibers that are randomly oriented and that are entangled together and a scrim reinforcement that is disposed within the polymeric material component to reinforce and stabilize the polymeric material component. The scrim reinforcement is disposed within the polymeric material component so that the scrim reinforcement is entirely covered and concealed by the entangled polymer fibers to prevent exposure of the scrim reinforcement to a user.

The textile top member includes carpet yarns and a backing coupled with the carpet yarns. The adhesive material that couples the cushion mat to the textile top member penetrates into the entangled polymer fibers of the polymeric material component to couple the cushion mat to the textile top member.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION OF THE INVENTION

Figure 1:
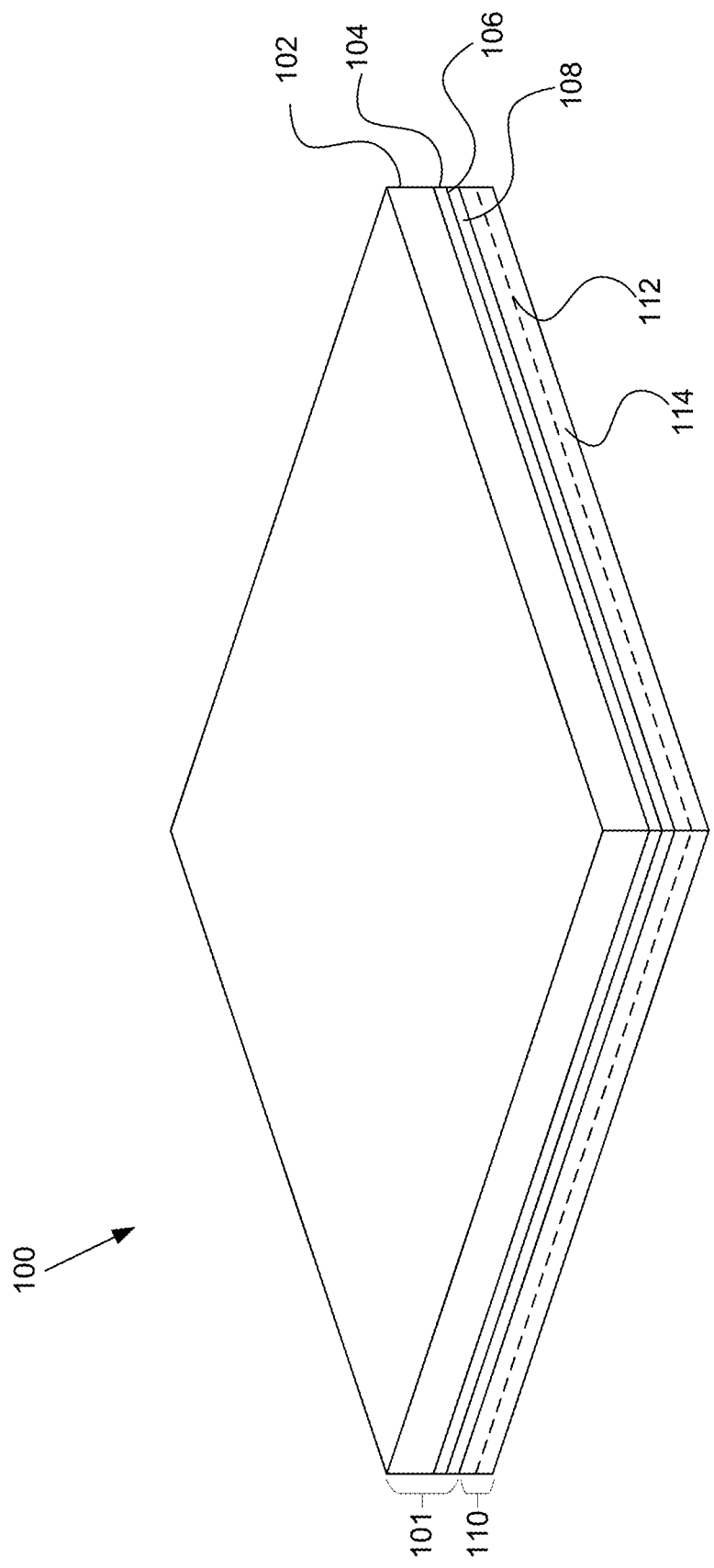
FIG. 1 is an isometric view of a carpet tile according to embodiments.

The ensuing description provides exemplary embodiments only, and is not intended to limit the scope, applicability, or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

The embodiments described herein provide a structurally reinforced cushioned impact-dampening component for carpet tile applications and other applications that utilize a cushioned backing or carrier. According to one embodiment, the cushioned backing is a heavy and lofty scrim-reinforced polymeric spunbond mat. When used herein, the term "heavy" refers to a mat that weighs more than 250 grams per square meter. The term "lofty" refers to a thick and low density material, such as a polymeric mat that is at least 1 mm thick and preferably at least 2 mm thick and that has a density of less than 15 lb/ft$^3$. Carpet tile panels are constructed in multiple layers consisting of carpet yarns, various backings, and thermoplastic compounds. Higher-end cushioned carpet tiles use primarily glass nonwoven mats for strength and rigidity along with a cushioned impact-dampening component. The cushioned backing or carrier described herein replaces several components in conventional carpet tile panels, including the conventional cushioned layer, at least one of the structural nonwoven layers (i.e., glass fiber mat), and potentially one of the thermoplastic compound layers. Instead of these various layers, the cushioned backing or carrier includes or consists of consolidated polymeric spunbond fibers and a scrim reinforcement component. The cushioned backing or carrier, which is commonly a scrim-reinforced spunbond mat, provides the mechanical strength and stability previously provided by the structural nonwoven layers (i.e., glass fiber mat), as well as the cushioning effect of the cushion mat. In addition, the loftiness of the scrim-reinforced spunbond mat gives the cushioned backing or carrier a high capacity for absorption of any coatings or additives the carpet tile producer may use. The loftiness characteristic of the cushioned or backing carrier that provides the high capacity for absorption property includes a large void fraction of the material, such as a fiber web density (e.g., measured in lb/ft$^3$ or g/cm$^3$) that is at least 49% less dense than the polymer material making up the fibers. The fiber web density may be up to 90% less dense than the polymer material making up the fibers. This results in the cushioned backing or carrier having a void fraction that is at least 51%, which means that the cushioned backing or carrier is at least 51% air or void space. The void fraction is typically quite higher than 51% and may be as high as 93%. In a specific embodiment, the void fraction is between 85% and 90% and in particular is approximately 89%.

According to one embodiment, the cushioned backing or carrier has a thickness of at least 1 millimeters, and more commonly a thickness of between 1 and 8 millimeters. In addition, the cushioned backing or carrier has a weight of at least 250 grams per square meter (gsm), and more commonly has a weight of between 250 and 1,000 gsm.

In another embodiment, the cushioned backing or carrier has a thickness between 2 and 6 millimeters and/or a weight of between 400 and 800 gsm. In yet another embodiment, the cushioned backing or carrier has a thickness between 3 and 5 millimeters and a weight of between 500 and 650 gsm. This cushioned backing or carrier could include a variety of polymers, but most commonly includes polyesters and polyolefins, either used alone or in combination. In an exemplary embodiment, the cushioned backing or carrier consists of polyester fibers. Polyester fibers are comfortable to handle and are bendable and able to recover from a bent state. The term "bendable" as used herein refers to materials that are not brittle. For example, the bendable fibers may be contorted, bent, wrapped, compressed, or in similar manners stressed without breaking. Stated differently, the bendable fibers do not break under normal roll handling and processing during carpet tile manufacturing and future use of the carpet tile. The terms "recoverable" or "spongy" as used herein refer to materials that are able to be compressed under weight without permanently deforming, such as a material that returns to its original thickness once a weight or compression is removed. Specifically, the cushioned backing or carrier should be able to withstand at least 15 pounds per square inch (psi) and compress less than 10% of its thickness at 15 psi. The resistance to compression allows the layer to have a spring or elastic like quality, which enables the cushioned backing or carrier to recover or return to an original volume after repeated compression.

In some instances, a binder may be used to adhere or bond the fibers of the cushioned backing or carrier together. When a binder is used, the binder is typically a formaldehyde-free binder. In other instances, the cushioned backing or carrier does not include a binder that bonds or adheres the fibers of the cushioned backing or carrier together. In such embodiments, the polymer fibers are mechanically bonded using techniques such as needling, which increases the physical entanglement of the polymer fibers. Needling of the polymer fibers may be preferred in order to avoid the need to use adhesive or other binders to bond or adhere the fibers together. The application of a binder or adhesive may render the cushioned backing or carrier (i.e., scrim-reinforced polymeric spunbond mat) too dense to absorb the adhesive that is used to adhere the cushioned backing or carrier to the carpet tile. The application of a binder or adhesive may also cause the cushioned backing or carrier to be too closed off or not sufficiently "spongy", which would impede the ability of the cushioned backing or carrier from properly recovering, thereby negatively impacting the desired cushioning effect of the cushioned backing or carrier. The cushioned backing or carrier should be sufficiently "open", which is defined in terms of the loftiness and high capacity for absorption described herein. Thus, in order to ensure that the cushioned backing or carrier provides a desired cushioning and comfort effect, mechanical bonding of the cushioned backing or carrier may be preferred.

It should be realized that the description of the cushioned backing or carrier not including a binder or adhesive as used herein is meant to describe a state or condition of the cushioned backing or carrier prior to bonding or coupling the cushioned backing or carrier with the carpet tile. Subsequent to bonding or coupling the cushioned backing or carrier with the carpet tile, the cushioned backing or carrier will include some adhesive material (i.e., the thermoplastic material), but the primary purpose of this material is not to bond or adhere the polymer fibers together, but is rather designed and meant to bond or couple the cushioned backing or carrier with a lower surface of the carpet tile. In addition, as described herein, the adhesive that is used to attach the cushioned backing or carrier to the carpet tile is only in the top portion of the cushioned backing or carrier and is not disposed throughout the cushioned backing or carrier. Rather, the bottom portion of the cushioned backing or carrier remains free of any adhesive. In some embodiments, the portion of the cushioned backing or carrier that is below the scrim material component remains entirely free of any adhesive.

The cushioned backing or carrier includes a scrim material that is disposed within the polymeric material component so that the scrim material is entirely covered and concealed by the intermeshed polymer fibers of the cushioned backing or carrier. The polymeric material component and the scrim material form a unitary or consolidated material since the two materials are integrally formed together, commonly without an adhesive or binder material. In contrast, conventional carpet tiles include an adhesive or binder layer between the backing and the cushion pad or mat. In contract, the cushioned backing or carrier described herein functions and acts like a single or unitary product due to the simultaneous forming of the materials as described herein.

The covering and concealing of the scrim material by the intermeshed polymer fibers prevents the scrim material from being exposed to the surrounding environment and to a user that is handling or installing the carpet tile. Unlike the glass fibers of the scrim material, the polymeric fibers of the cushioned backing or carrier are not itchy or otherwise irritating or uncomfortable to handle. Since the scrim material is entirely covered and concealed by the polymer fibers, the cushioned backing or carrier is suitable for handling during installation of the carpet tile. In contrast, conventional carpet tile typically employ multiple thermoplastic layers or films that are required to coat and encapsulate a fiberglass backing. These thermoplastic layers or films are required to ensure that the fiberglass backing does not contact a user during handling or installation of the carpet tile. The instant carpet tile does not require the use of the thermoplastic layers or films since the scrim material is entirely contained within the cushioned backing or carrier, which encapsulates the scrim material and prevents the user from contacting the scrim material. Rather, the user handles and contacts the polymer fibers, which are not itchy or irritating to handle.

The scrim material forms a reinforcement layer within the cushioned backing or carrier and thus, the scrim material may also be referred to herein as a scrim reinforcement. The scrim reinforcement is configured to mechanically reinforce and stabilize the cushioned backing or carrier. Dimensional stability is important in a carpet tile. Dimensional stability is the ability of a carpet tile to lie flat and remain flat and square on a floor surface under conditions of normal use. The industry standard Aachen DIN STD 54318 test is used to determine the dimensional stability. The scrim reinforcement is sufficient to stabilize the carpet tile to impart the required dimensional stability.

The scrim reinforcement is typically made of glass fibers that are formed or arranged in a grid pattern, although other non-glass fibers may be used in place of or in addition to the glass fibers. The scrim reinforcement is introduced into the cushioned backing or carrier during production of the cushioned backing or carrier. The mechanical bonding (e.g., needling) of the polymer fibers is sufficient to entrap and attach the scrim reinforcement to the cushioned backing or carrier. The scrim reinforcement may be located in the middle of the cushioned backing or carrier so that there is an equal weight or density of the polymer fibers both above and below the scrim reinforcement. In other embodiments, the scrim reinforcement may be shifted toward an upper surface of the cushioned backing or carrier to tailor the strength and cushioning ability of the cushioned backing or carrier. A bottom surface of the cushioned backing or carrier is formed of the polymer fibers, which provide a relatively smooth and finished surface for facing the floor.

In some instances, the cushioned backing or carrier does not have sufficient strength and stability without the incorporation of the scrim reinforcement within the cushioned backing or carrier. In other instances, the cushioned backing or carrier may not include a scrim reinforcement. Rather, the cushioned backing or carrier may employ coarse polymer fibers and have a more dense configuration, which may allow the cushioned backing or carrier to be sufficiently strong and stable without the use of a scrim reinforcement.

Having described various embodiments generally, additional aspects and features of the carpet tile and cushioned backing or carrier will be more evident with reference to the description of the various drawings provided herein below.

Figure 2:
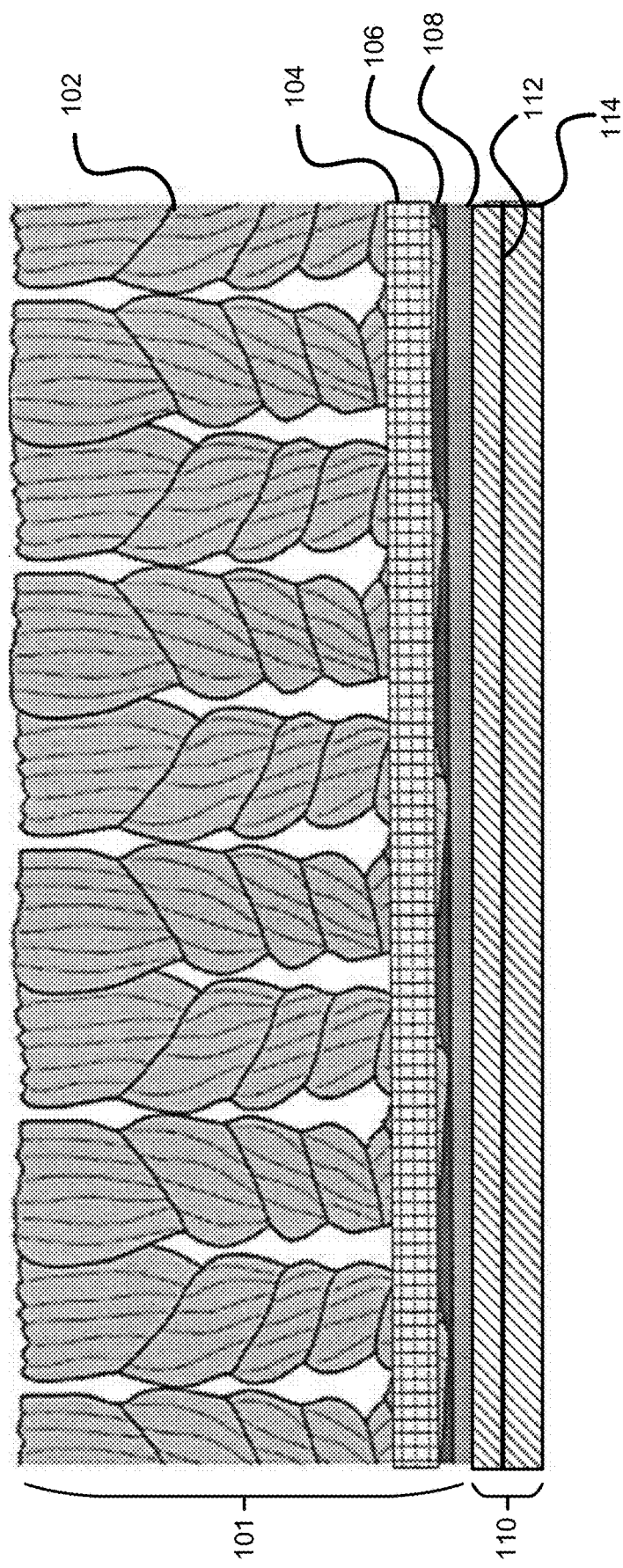
FIG. 2 is a detailed side view of the carpet tile of FIG. 1.

FIGS. 1 and 2 illustrate an embodiment of a carpet tile 100. The carpet tile 100 is shown as being square-shaped, which is a common shape of carpet tiles. However, as a person of skill in the art will readily recognize, the carpet tile 100 may be cut or otherwise formed in any desired shape and/or can be sized to match any desired application. Additionally, the textile top member may be formed from any fabric or other textile material to fit the needs or aesthetics of a particular application. Carpet tile 100 includes a textile top member 101 that is positioned atop a cushioned backing or carrier 110. For ease in describing the embodiments, the cushioned backing or carrier will be referred to hereinafter as a cushion mat 110.

The textile top member includes carpet yarns 102 that are attached to a backing 104. The carpet yarns 102 may be formed from any fabric or other textile material to fit the needs or aesthetics of a particular application, and may specifically include tufted carpet yarns, pile fabric yarns, polyester fibers, nylon fibers, polyolefin fibers, and the like. The carpet yarns 102, such as a pile fabric layer or other fabric layer, serves as an exposed top surface of the carpet tile. The carpet yarns 102 are typically hooked through the backing 104 and secured or coupled to the back of the backing 104. Coupling the carpet yarns 102 to the backing 104 typically involves using various adhesives, such as hot melt materials. The backing 104 is typically a woven or nonwoven material that is often made of polymer, cellulose fibers, or a combination of these. The backing 104 structurally supports and reinforces the textile top member 101. A pre-coat 106 is typically positioned on the backing 104 to lock the carpet yarns 102 in place. The pre-coat may be a latex based material or any other suitable material. In some instances, the pre-coat may be a hot melt adhesive that may be designed to permit lamination between the textile top member 101 and the cushion mat 110. The textile top member 101 and/or carpet tile 100 may include additional materials, such as flame retardants and the like, depending on the end use of the carpet tile 100.

The cushion mat 110 is attached to the textile top member 101 via a thermoplastic material 108, such as a thermoplastic elastomer and/or a plastisol material.

Exemplary thermoplastic materials 108 that may be used to couple the cushion mat 110 with the textile top member 101 include polymers or copolymers of latex, vinyl chlorides, polyolefins, polyurethanes, acrylates, acrylics, or styrenes. The thermoplastic material 108 typically adheres to the precoat layer 106 and penetrates into the cushion mat 110. The amount or degree of penetration of the thermoplastic material 108 into the cushion mat 110, may be controlled as described below. The cushion mat 110 is designed to be a lofty material that provides impact dampening for the carpet tile 100. The cushion mat 110 is also strong enough to contribute to the structural integrity of the finished carpet tile 100 in the same manner as conventional backings.

The cushion mat 110 is a multi-function unitary or consolidated material that provides the above described cushioning and structural features. The consolidated cushion mat 110 replaces multiple layers in conventional carpet tiles, such as a separate cushioning mat, secondary backing, and thermoplastic coating layer. The secondary backing material that is used in conventional carpet tiles is typically a glass nonwoven. The secondary backing material is a required layer that provides dimensional stability to the carpet tile. The secondary backing is coated with a thermoplastic coating so that the glass fibers are not exposed to a user, which may cause irritation and/or itch. The thermoplastic coating is typically applied as a coating to the top and bottom of the secondary backing to ensure that the thermoplastic material fully surrounds and encapsulate the glass fibers. The thermoplastic coating is also used to attach the secondary backing to the cushion mat so that the secondary backing forms a separate layer atop the cushion mat. The cushion mat can be either a foamed polymeric material, such as polyurethane or a felt material. The cushion mat may contain additional additives, such as fire retardants and the like.

In contrast to these various layers, the cushion mat 110 described herein is a unitary or consolidated material that is able to provide both cushioning or impact dampening and structural strength. The term unitary or consolidated means that the components of the cushion mat 110 are formed in a manner that results in the cushion mat 110 functioning as a single material. The cushioning is provided by a polymeric material component 114 that includes polymer fibers that are randomly oriented and entangled together. The polymeric material component 114 is typically a spunbond material that is lofty and recoverable, meaning that the material is an elastically compressible material that is able to rebound or recover from a compressed state. The polymer fibers of the polymeric material component 114 may comprise or consist of polyesters, polyolefins, or a combination of polyesters and polyolefins.

The structural strength is provided by a scrim reinforcement 112 that is disposed within the polymeric material component 114 so that the scrim reinforcement 112 is entirely covered and concealed by the intermeshed or entangled polymer fibers. The positioning of the scrim reinforcement 112 within the polymeric material component 114 prevents the scrim reinforcement 112 from being exposed to the surrounding environment, and in particular to a user that may be handling or installing the cushion mat 110 or carpet tile 100. The scrim reinforcement 112 is a fiber mat that includes fibers or rovings that are typically oriented perpendicularly. The fibers or rovings may be made of various fibers, but are commonly made of glass fibers. The scrim reinforcement 112 mechanically reinforces and stabilizes the carpet tile.

The cushion mat 110 typically has a thickness between 1 and 8 millimeters. In a more specific embodiment, the cushion mat 110 has a thickness of between 2 and 6 millimeters. In yet another specific embodiment, the cushion mat 110 has a thickness of between 3 and 5 millimeters.

The density of the cushion mat 110 may vary depending on the end application of the carpet tile 100. For example, the cushion mat 110 may be constructed to be relatively thin and dense or thick and open. The former construction may allow the cushion mat 110 to hold its shape better and may be suited for high use or traffic areas while the latter construction may be preferred for increased cushioning and comfort due to its loftier design. The cushion mat 110 typically has a weight of between 250 and 1,000 grams per square meter (gsm), and more commonly has a weight of between 400 and 800 gsm. In s specific embodiment, the cushion mat 110 has a weight of between 500 and 650 gsm.

In some embodiments, a binder may be used to adhere or bond the polymer fibers of the polymeric material component 114 together. In other embodiments, the polymeric material component 114 does not include a binder that bonds or adheres the polymer fibers together. Rather, the polymer fibers are mechanically bonded using techniques such as needling, which increases the physical entanglement of the polymer fibers. The polymer fibers are mechanically bonded (e.g., needled) together in a manner that ensures that the polymeric material component 114 and scrim reinforcement 112 are mechanically bonded or interlocked such that the cushion mat 110 does not include an adhesive material that bonds the polymeric material component 114 and scrim reinforcement 112 together.

Mechanical bonding of the polymer fibers is typically preferred to avoid the need to use adhesive or other binders that may negatively impact desired properties of the cushion mat 110. For example, the use of adhesives may render the cushion mat 110 too dense to absorb the thermoplastic material that bonds the cushion mat 110 to the textile top member 101. The use of adhesives may also cause the cushion mat 110 to be too closed off or not sufficiently "spongy", which would impede the ability of the cushion mat 110 from being elastically compressed, thereby negatively impacting the desired cushioning and dampening effect. Stated differently, the use of an adhesive may make the cushion mat 110 too rigid to be effectively used in cushioning the carpet tile 100. If the cushion mat 110 is free of a binder or adhesive, the polymer fibers may move relative to one another in a manner that allows the fibers to more elastically recover from a compressed stated, thereby increasing the desired cushioning and dampening effect of the cushion mat 110.

As briefly described above, the cushion mat 110 is relatively porous or has a degree of openness that allows the cushion mat 110 to absorb a thermoplastic compound or material 108 that is used to bond or adhere the cushion mat 110 to the textile top member 101. Since the thermoplastic material 108 absorbs into the cushion mat 110 to a degree, the cushion mat 110 will include some amount of an adhesive material after the cushion mat 110 is attached to the textile top member 101. However, in embodiments in which the cushion mat 110 does not include a binder or adhesive, the cushion mat 110 does not include a binder or adhesive that is separate from the thermoplastic material 108 that bonds the individual polymer fibers together. Thus, even though the thermoplastic material 108 absorbs into the cushion mat 110 to a degree, many or most of the polymer fibers, and a substantial portion or volume of the cushion mat 110, remains free of a binder or adhesive. For example, as described below, the thermoplastic material 108 typically does not penetrate into the cushion mat 110 below the scrim reinforcement 112 and thus, even though some of the thermoplastic material 108 is absorbed into the cushion mat 110, the portion or volume of the cushion mat 110 below the scrim reinforcement remains free of the thermoplastic material 108 and free of any other binder or adhesive materials.

In some embodiments, the thermoplastic material may absorb into the cushion mat 110 and may fully surround and encapsulate the scrim reinforcement 112 that is disposed within the cushion mat. In such embodiments, the scrim reinforcement 112 may be both positioned within the cushion mat 110 and fully encapsulated and covered by the thermoplastic material 108. The full encapsulation of the scrim reinforcement 112 by the thermoplastic material may aid in reinforcing the carpet tile.

In some embodiments, the polymer fibers of the polymeric material component 114 comprise or consist of polymer fibers having an average fiber diameter of between 0.5 and 10 denier, and more commonly comprise or consist of polymer fibers having an average fiber diameter of between 1 and 10 denier. In more specific embodiments, the polymer fibers comprise or consist of polymer fibers having an average fiber diameter of between 2.5 and 9 denier and most commonly comprise or consist of polymer fibers having an average fiber diameter of between 4 and 9 denier. The larger fiber diameters typically yield stronger fibers that are more resistant to compression and able to handle more weight and/or recover better to compression events. Polymer fibers, and in particular polyester fibers, demonstrate good abilities in resisting compression and handling weight.

In some embodiments, the scrim reinforcement comprises or consists of glass fibers having an average fiber diameter between about 10 and 90 tex and more commonly comprises or consists of glass fibers having an average fiber diameter between about 10 and 50 tex or between 50 and 90 tex. In a specific embodiment, the scrim reinforcement comprises or consists of glass fibers having an average fiber diameter between about 30 and 36 tex or between 65 and 71 tex. Thicker glass fibers typically result in greater tensile strength and may be employed when stronger scrim reinforcement materials are required.

Figure 3:
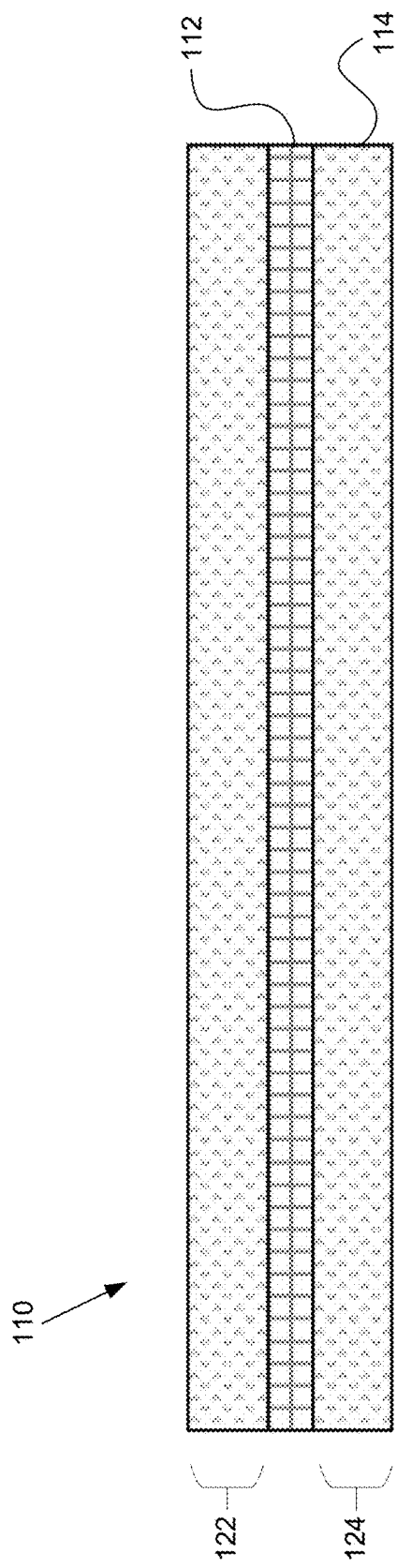
FIGS. 3 and 4 illustrate embodiments of a cushion mat of the carpet tile of FIG. 1 in greater detail.
Figure 4:
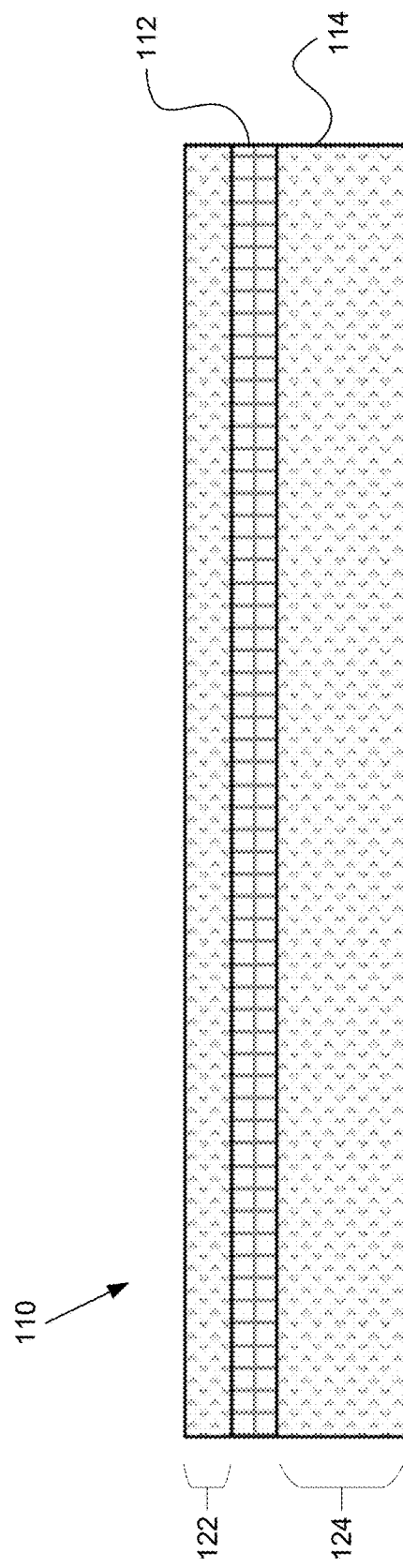

Referring now to FIGS. 3 and 4, embodiments of the cushion mat 110 are illustrated in greater detail. Specifically, FIGS. 3 and 4 illustrate how the position of the scrim reinforcement 112 within the polymeric material component 114 may be adjusted to achieve a desired effect in the carpet tile 100. In FIG. 3, the scrim reinforcement 112 is roughly centered within the polymeric material component 114 so that a first portion or volume 122 of polymer fibers that is positioned above the scrim reinforcement 112 is roughly equal to a second portion or volume 124 of polymer fibers that is positioned below the scrim reinforcement 112. The centered configuration of the scrim reinforcement 112 may be desired when increased bonding between the cushion mat 110 and textile top member 101 is desired. For example, since the thermoplastic material 108 typically penetrates into the cushion mat 110 up to the scrim reinforcement 112, but not beyond the scrim reinforcement, the center positioning of the scrim reinforcement 112 allows additional thermoplastic material 108 to absorb into the cushion mat 110, which increases the bond between the cushion mat 110 and the textile top member 101. The increased penetration of the thermoplastic material 108 into the cushion mat 110 may render the cushion mat 110 more rigid and more resistant to wear. Thus, the center positioning of the scrim reinforcement 112 may be preferred when the carpet tile 100 is used in high traffic areas. The non-centered positioned of the scrim reinforcement 112 may result in a more loftier and cushioning mat 110, which may be preferred in areas where increased comfort is desired.

In contrast, in FIG. 4, the scrim reinforcement 112 is non-centered within the polymeric material component 114 so that the scrim reinforcement is positioned closer to a top surface of the polymeric material component 114 than a bottom surface of the polymeric material component 114. Since the scrim reinforcement 112 is not centered within the polymeric material component 114, the first portion or volume 122 of polymer fibers that is positioned above the scrim reinforcement 112 is less than the second portion or volume 124 of polymer fibers that is positioned below the scrim reinforcement 112. The non-centered scrim reinforcement 112 may be preferred when increased cushioning or dampening is preferred. For example, the cushioning or dampening effect of the cushion mat 110 may be provided mainly from the second portion or volume 124 of polymer fibers. Since the second portion or volume 124 of polymer fibers is greater when the scrim reinforcement 112 is not centered, the cushioning or dampening properties of the cushion mat 110 may be enhanced. In addition, the thermoplastic material 108 typically does not penetrate into the polymeric material component 114 below the scrim reinforcement 112 and thus, the second portion or volume 124 of polymer fibers are not constrained or restricted in their movement and response by the thermoplastic material 108. As such, the polymer fibers in the second portion or volume 124 may be more responsive as the cushion mat is compressed, which may enhance the desired cushioning and dampening properties of the cushion mat 110.

In some embodiments, the scrim reinforcement 112 is positioned within the polymeric material component 114 so that at least 65% or 70% of the polymer fibers are positioned below the scrim reinforcement 112 and at least 5% of the polymer fibers are positioned above the scrim reinforcement 112. Stated differently, the scrim reinforcement 112 may be positioned within the polymeric material component 114 so that the second portion or volume 124 is at least 65% or 70% of the volume of the cushion mat 110 and the first portion or volume 122 is at least 5% of the volume of the cushion mat 110. In other embodiments, the scrim reinforcement 112 is positioned within the polymeric material component 114 so that at least 60-95% of the polymer fibers are positioned below the scrim reinforcement 112 and so that at least 5-40% of the polymer fibers are positioned above the scrim reinforcement 112. In a more specific embodiment, the scrim reinforcement 112 is positioned within the polymeric material component 114 so that at least 65-90% of the polymer fibers are positioned below the scrim reinforcement 112 and so that at least 10-35% of the polymer fibers are positioned above the scrim reinforcement 112. In yet another specific embodiment, the scrim reinforcement 112 is positioned within the polymeric material component 114 so that at least 65-75% of the polymer fibers are positioned below the scrim reinforcement 112 and so that at least 25-35% of the polymer fibers are positioned above the scrim reinforcement 112.

The scrim reinforcement 112 may be positioned within the polymeric material component 114 during formation of the polymeric material component 114. Stated differently, incorporation of the scrim reinforcement 112 into the polymeric material component 114 may be achieved in a single step or process so that the individual materials are not separately formed and then combined in a later stage or process (i.e., separately made and then bonded together). Rather, the materials may be formed simultaneously, which results in a cushion mat 110 that functions and behaves as a unitary or single component in terms of structure and integrity despite having different fiber compositions and/or materials. To form the materials simultaneously, the second portion or volume 124 may be formed, via spunbonding or another process, and the scrim reinforcement 112 may be laid atop the second portion or volume 124 while the first portion or volume 122 is being formed, via spunbonding or another process. The various materials may then be mechanically bonded, such as via needling to make the cushion mat 110 function and behave as a single or unitary product.

As described herein, the thermoplastic material 108 typically penetrates into the polymeric material component 114 to couple the cushion mat 110 to the textile top member 101. The thermoplastic material 108 is able to penetrate into the polymeric material component 114 due to a permeability of the polymeric material component 114. In contrast, in conventional carpet tile the adhesive material typically rests atop a secondary backing or only penetrates a negligible amount into the materials. The adhesive material typically coats the materials or penetrates into the materials just enough to adhere the two materials. The penetration of the thermoplastic material 108 into the polymeric material component 114 in the instant embodiments enhances the bonding between the cushion mat 110 and the textile top member 101.

In the instant embodiments, the scrim reinforcement 112 is typically configured to control penetration of the thermoplastic material 108 into the polymeric material component 114 so that the thermoplastic material 108 is able to penetrate into the polymeric material component 114 up to the scrim reinforcement 112, but not beyond the scrim reinforcement 112. Limiting the penetration of the thermoplastic material 108 into the polymeric material component 114 helps ensure that a desired cushioning effect is achieved. The depth or degree of penetration of the thermoplastic material 108 into the cushion mat 110 may be controlled by varying the position of the scrim reinforcement 112 within the polymeric material component 114. In embodiments in which the cushion mat 110 is free of a binder or adhesive material, the cushion mat 110 does not include the thermoplastic material 108 or any other binder or adhesive materials below the scrim reinforcement 112.

Figure 5:
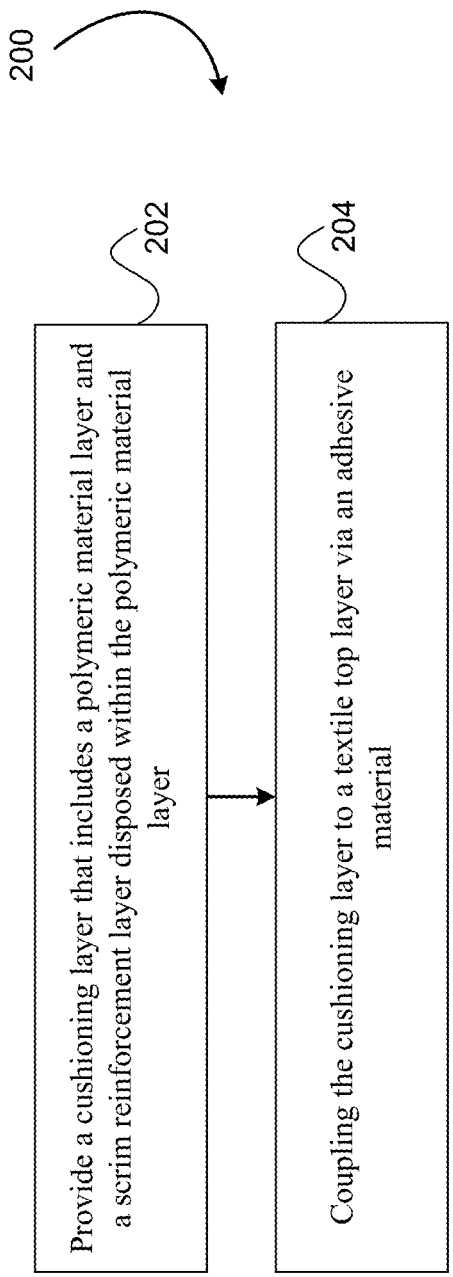
FIG. 5 illustrates a method of manufacturing a carpet tile.

Referring now to FIG. 5, illustrated is a method 200 of manufacturing a carpet tile. At block 202, a cushion mat is provided. As described herein, the cushion mat includes a polymeric material component having polymer fibers that are randomly oriented and that are entangled together and a scrim reinforcement that is disposed within the polymeric material component to mechanically reinforce and stabilize the polymeric material component. The scrim reinforcement is disposed within the polymeric material component so that the scrim reinforcement is entirely covered and concealed by the entangled and intermeshed polymer fibers, which prevents exposure of the scrim reinforcement to a user and/or the surrounding environment. At block 204, the cushion mat is coupled to a textile top member of the carpet tile via an adhesive material. As described herein, the textile top member includes carpet yarns and a backing that is coupled with the carpet yarns. The adhesive material penetrates into the entangled polymer fibers of the polymeric material component to couple the cushion mat to a textile top member of the carpet tile. The cushion mat may have a thickness between 1 and 8 millimeters and may have a density of between 250 and 1,000 grams per square meter (gsm).

In some embodiments, the adhesive material that penetrates into the entangled polymer fibers of the polymeric material component is a thermoplastic material or a plastisol. The polymer fibers of the polymeric material component may include or consist of polyesters, polyolefins, or a combination of polyesters and polyolefins. The polymer fibers of the polymeric material component may be mechanically needled together in a manner that ensures that the polymeric material component and scrim reinforcement are mechanically bonded so that the cushion mat does not include an adhesive material that bonds the polymer fibers and scrim reinforcement together.

In some embodiments, the scrim reinforcement is non-centered within the polymeric material component so that the scrim reinforcement is positioned closer to a top surface of the polymeric material component than a bottom surface of the polymeric material component. For example, the scrim reinforcement may be positioned within the polymeric material component so that at least 60% of the polymeric material of the polymeric material component is positioned below the scrim reinforcement and at least 5% of the polymeric material of the polymeric material component is positioned above the scrim reinforcement. In a more specific embodiment, the scrim reinforcement may be positioned within the polymeric material component so that at least 70% of the polymeric material of the polymeric material component is positioned below the scrim reinforcement and at least 10% of the polymeric material of the polymeric material component is positioned above the scrim reinforcement.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A carpet tile comprising:
    a textile top member including:
        carpet yarns; and
        a backing that is coupled with the carpet yarns so that the backing structurally supports the carpet yarns; and
    a cushion mat coupled with the textile top member via a thermoplastic material, the cushion mat having a layered configuration comprising:
        a first portion of polymer fibers that are randomly oriented and entangled together;
        a second portion of polymer fibers that are randomly oriented and entangled together; and
        a scrim reinforcement that is positioned between and separates the first portion of polymer fibers from the second portion of polymer fibers so that the scrim reinforcement is entirely covered and concealed by the entangled polymer fibers of the first portion and second portion of fibers to prevent the scrim reinforcement from exposure to a user, the scrim reinforcement being configured to mechanically reinforce and stabilize the polymeric material component and carpet tile;
    wherein the thermoplastic material penetrates into the first portion of polymer fibers to couple the cushion mat with the textile top member;
    wherein the scrim reinforcement is configured to control penetration of the thermoplastic material so that the thermoplastic material does not penetrate into the second portion of polymer fibers; and
    wherein the scrim reinforcement is positioned so that the second portion of polymer fibers is at least 65% of a volume of the cushion mat and the first portion of polymer fibers is at least 5% of the volume of the cushion mat.

2. The carpet tile of claim 1, wherein the cushion mat has a thickness between 1 and 8 millimeters.

3. The carpet tile of claim 1, wherein the cushion mat has a weight of between 250 and 1,000 grams per square meter (gsm).

4. The carpet tile of claim 1, wherein the polymer fibers of the first portion or the second portion of polymer fibers comprises polyesters, polyolefins, or a combination of polyesters and polyolefins.

5. The carpet tile of claim 1, wherein the cushion mat does not include a binder that adhesively bonds the polymer fibers together.

6. The carpet tile of claim 1, wherein the scrim reinforcement: consists of glass fibers having an average fiber diameter between about 10 and 90 tex.

7. The carpet tile of claim 1, wherein the cushion mat includes a binder that adheres or bonds the first portion of polymer-fibers, the second portion of polymer fibers, and the scrim reinforcement together.

8. The carpet tile of claim 1, wherein the cushion mat does not include any binder or adhesive materials below the scrim reinforcement.

9. The carpet tile of claim 1, wherein the first portion of polymer fibers or the second portion of polymer fibers have an average fiber diameter of between 0.5 and 10 denier.

10. The carpet tile of claim 9, wherein the first portion of polymer fibers are mechanically needled together with the second portion of polymer fibers so that the scrim reinforcement is mechanically bonded to the first portion of polymer fibers and the second portion of polymer fibers.

11. A carpet tile comprising:
a textile top member including:
carpet yarns; and
a backing that is coupled with the carpet yarns so that the backing structurally supports the carpet yarns; and
a cushion mat coupled with the textile top member via a thermoplastic material, the cushion mat having a layered configuration comprising:
a first portion of polymer fibers that are randomly oriented and entangled together;
a second portion of polymer fibers that are randomly oriented and entangled together; and
a scrim reinforcement that is positioned between and separates the first portion of polymer fibers from the second portion of polymer fibers so that the scrim reinforcement is entirely covered and concealed by the entangled polymer fibers of the first portion and second portion of fibers to prevent the scrim reinforcement from exposure to a user, the scrim reinforcement being configured to mechanically reinforce and stabilize the polymeric material component and carpet tile;
wherein the thermoplastic material penetrates into the first portion of polymer fibers to couple the cushion mat with the textile top member;
wherein the scrim reinforcement is configured to control penetration of the thermoplastic material so that the thermoplastic material does not penetrate into the second portion of polymer fibers; and
wherein the cushion mat does not include any binder or adhesive materials below the scrim reinforcement.

12. The carpet tile of claim 11, wherein the cushion mat has a thickness between 1 and 8 millimeters.

13. The carpet tile of claim 11, wherein the cushion mat has a weight of between 250 and 1,000 grams per square meter (gsm).

14. The carpet tile of claim 11, wherein the polymer fibers of the first portion or the second portion of polymer fibers comprises polyesters, polyolefins, or a combination of polyesters and polyolefins.

15. The carpet tile of claim 11, wherein the cushion mat does not include a binder that adhesively bonds the polymer fibers together.

16. The carpet tile of claim 11, wherein the scrim reinforcement:
consists of glass fibers having an average fiber diameter between about 10 and 90 tex.

17. The carpet tile of claim 11, wherein the scrim reinforcement is positioned so that the second portion of polymer fibers is at least 65% of a volume of the cushion mat and the first portion of polymer fibers is at least 5% of the volume of the cushion mat.

18. The carpet tile of claim 11, wherein the first portion of polymer fibers or the second portion of polymer fibers have an average fiber diameter of between 0.5 and 10 denier.

19. The carpet tile of claim 18, wherein the first portion of polymer fibers are mechanically needled together with the second portion of polymer fibers so that the scrim reinforcement is mechanically bonded to the first portion of polymer fibers and the second portion of polymer fibers.

* * * * *